United States Patent [19]
Martin

[11] 3,822,756
[45] July 9, 1974

[54] MULTIPLE IMPLEMENT COUPLING STRUCTURE

[76] Inventor: William E. Martin, Martin Company, P.O. Box 187, Kewanee, Ill. 61443

[22] Filed: Mar. 17, 1972

[21] Appl. No.: 235,543

[52] U.S. Cl............ 180/14 R, 280/34 R, 280/34 A
[51] Int. Cl............................................. B60d 1/00
[58] Field of Search.......... 180/14; 280/421, 423 B, 280/425 A; 37/117.5; 172/272

[56] References Cited
UNITED STATES PATENTS

| | | | |
|---|---|---|---|
| 2,952,476 | 9/1960 | Brockman | 280/423 B |
| 2,978,128 | 4/1961 | Polich | 214/506 |
| 3,150,884 | 9/1964 | Drott | 280/460 |
| 3,329,225 | 7/1967 | Dunn | 180/1 |
| 3,391,950 | 7/1968 | Carter | 280/421 |
| 3,479,055 | 11/1969 | Cunha | 280/407 |
| 3,586,119 | 6/1971 | Chuchua | 180/14 |
| 3,628,811 | 10/1969 | Rivers | 280/421 |
| 3,719,244 | 3/1973 | Miller | 180/14 |

Primary Examiner—David Schonberg
Assistant Examiner—Terrance L. Siemens
Attorney, Agent, or Firm—Colton & Stone, Inc.

[57] ABSTRACT

Each of a plurality of implements may be precisely aligned and rigidly coupled with the same traction unit through the intermediary of coacting cam surfaces and power operated latching means. The aligning and coupling as well as decoupling operations are controlled from the operator's station on the traction unit. Separate coacting cam surfaces on each of the implements cooperate with complementary cam surfaces on the traction unit to effect both horizontal and vertical alignment as a function of driving the traction unit into engagement with the selected implement. Immediately following this alignment procedure, by driving, which auotmatically effects three dimensional adjustment between the implement and traction unit, the power operated latch is actuated to rigidly couple the implement and traction units into an integrated unit.

One purpose of the very precise alignment is to facilitate a concomitant hydraulic coupling between the traction unit and implement while another advantage, relying more on the rigidity of the coupling, is to provide that functionally unitary frame structure characterizing certain conventional earth moving equipment such as scrapers and patrol graders.

37 Claims, 35 Drawing Figures

FIG. 19
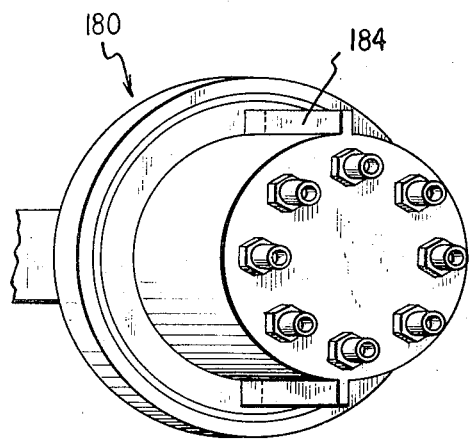
FIG. 20
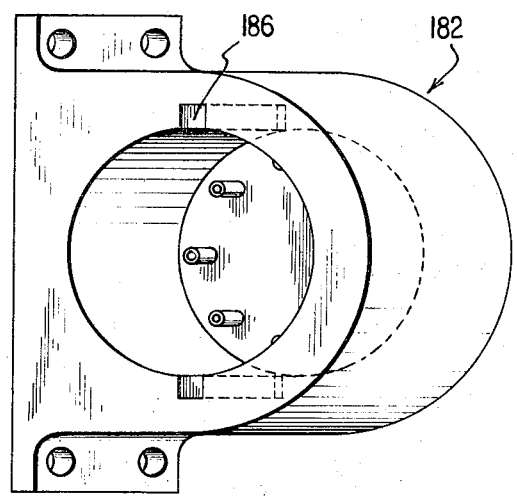
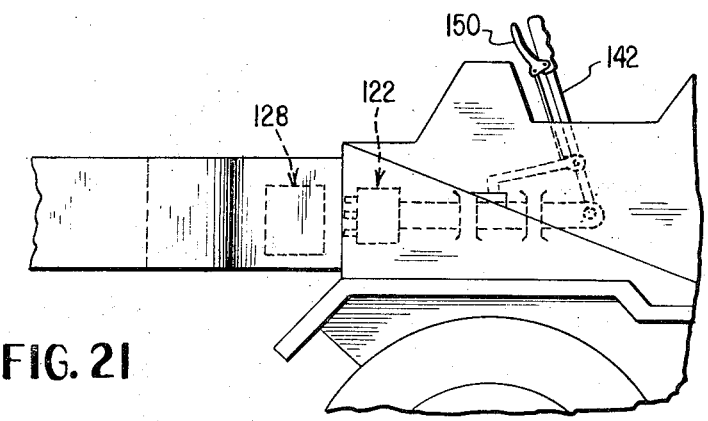
FIG. 21
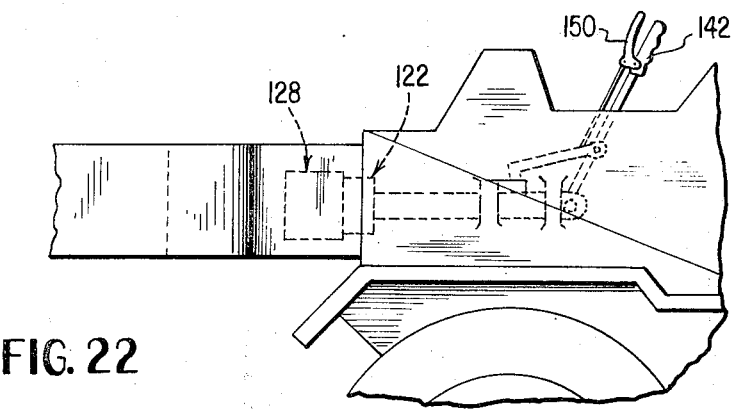
FIG. 22

FIG. 23
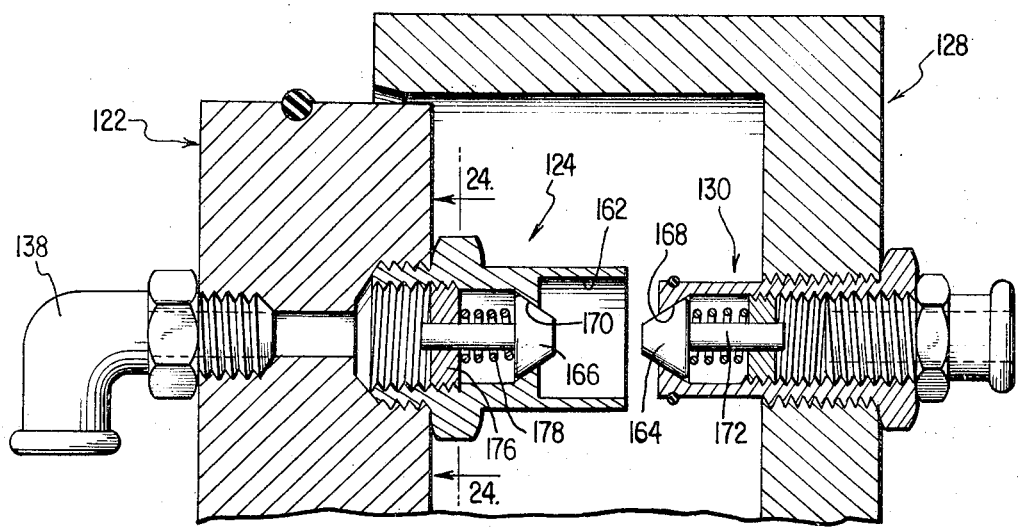
FIG. 24
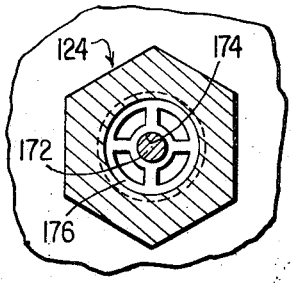
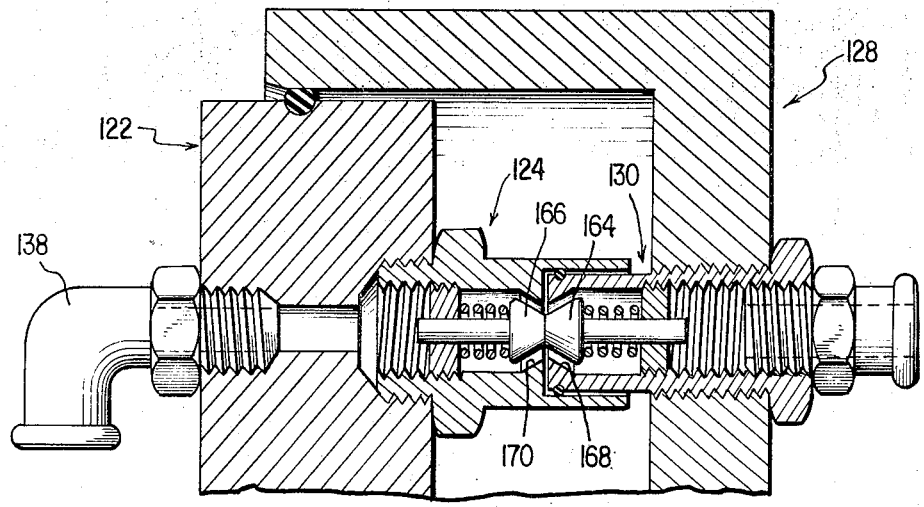
FIG. 25

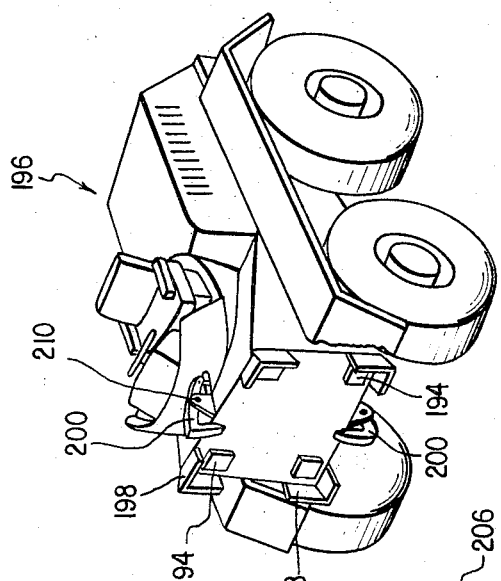
FIG. 26
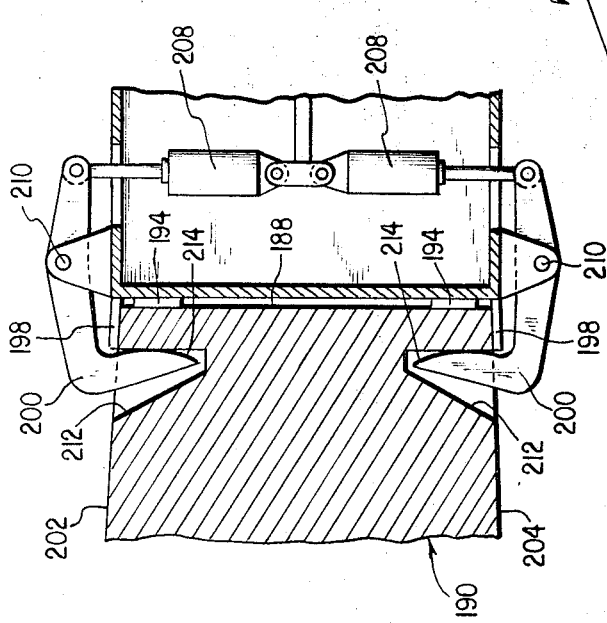
FIG. 27
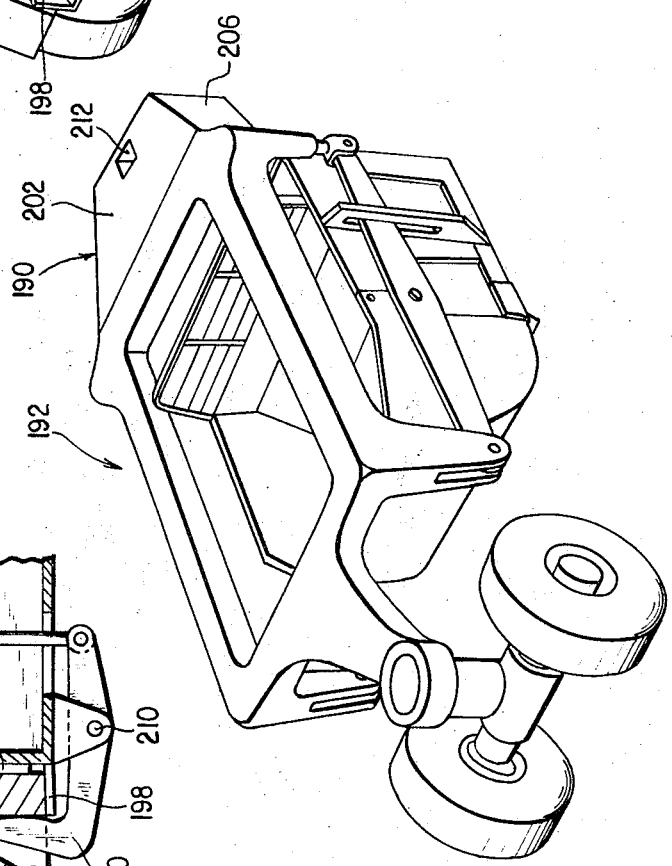

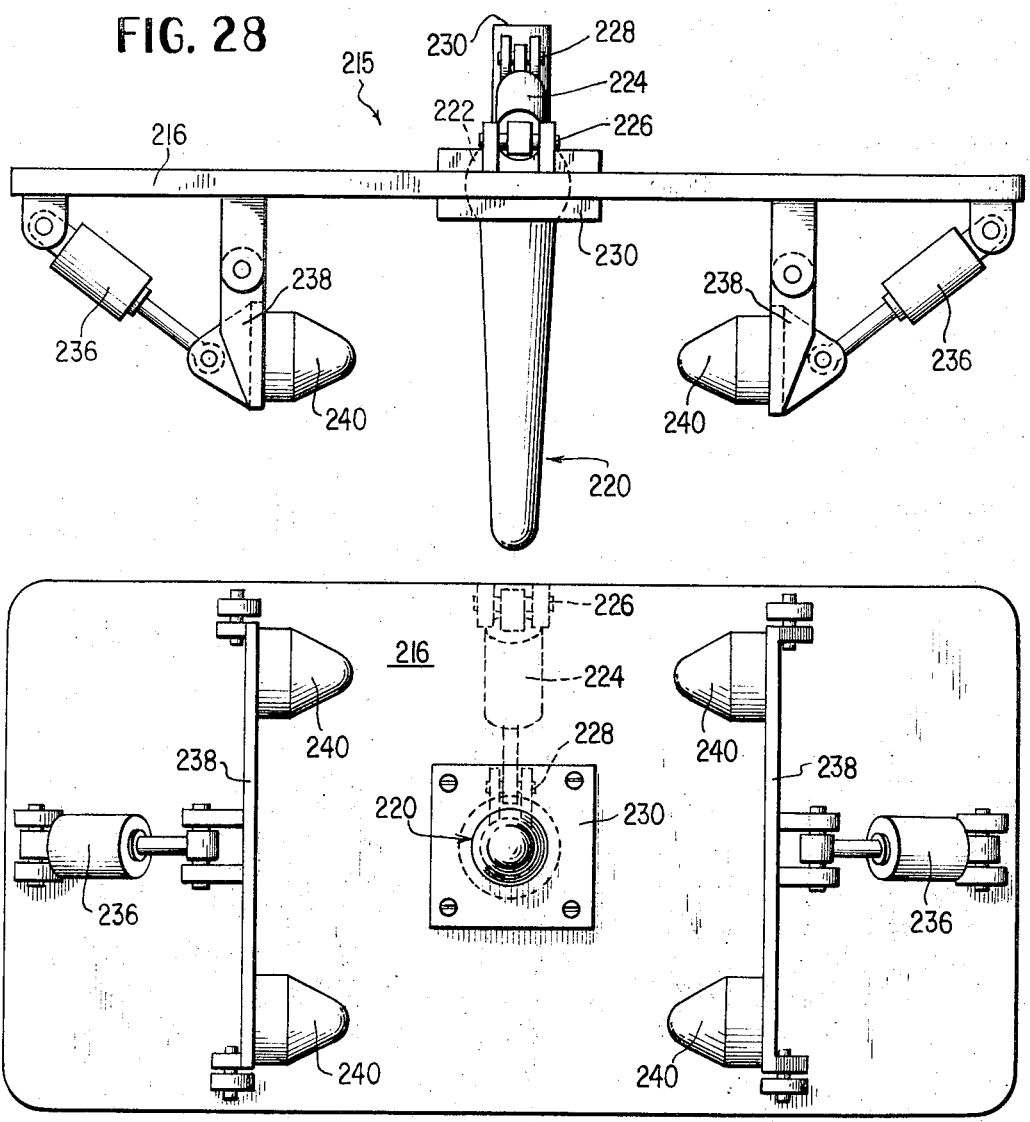
FIG. 28
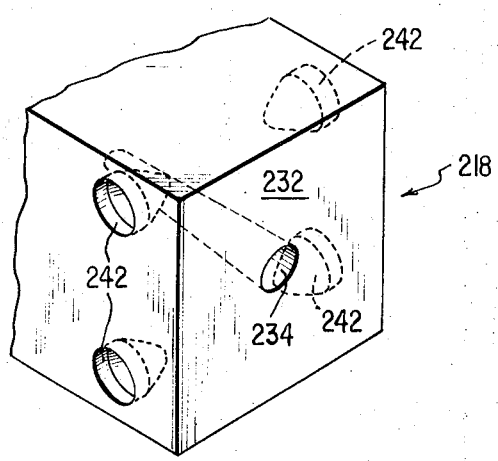
FIG. 29
FIG. 30

FIG. 31
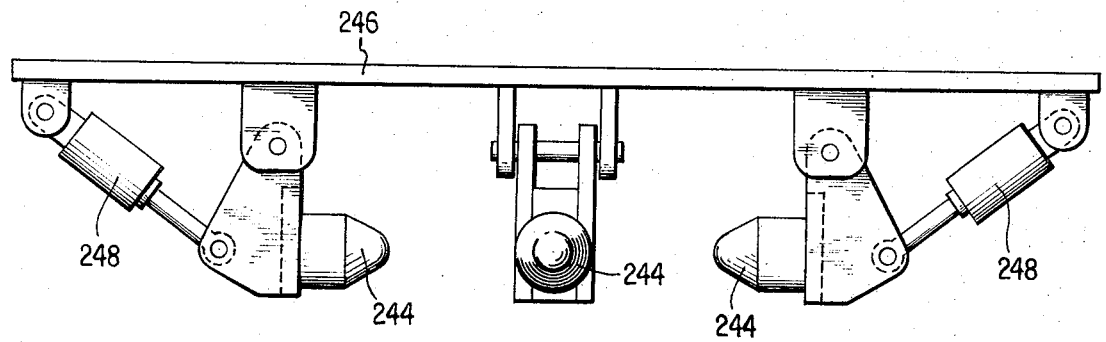
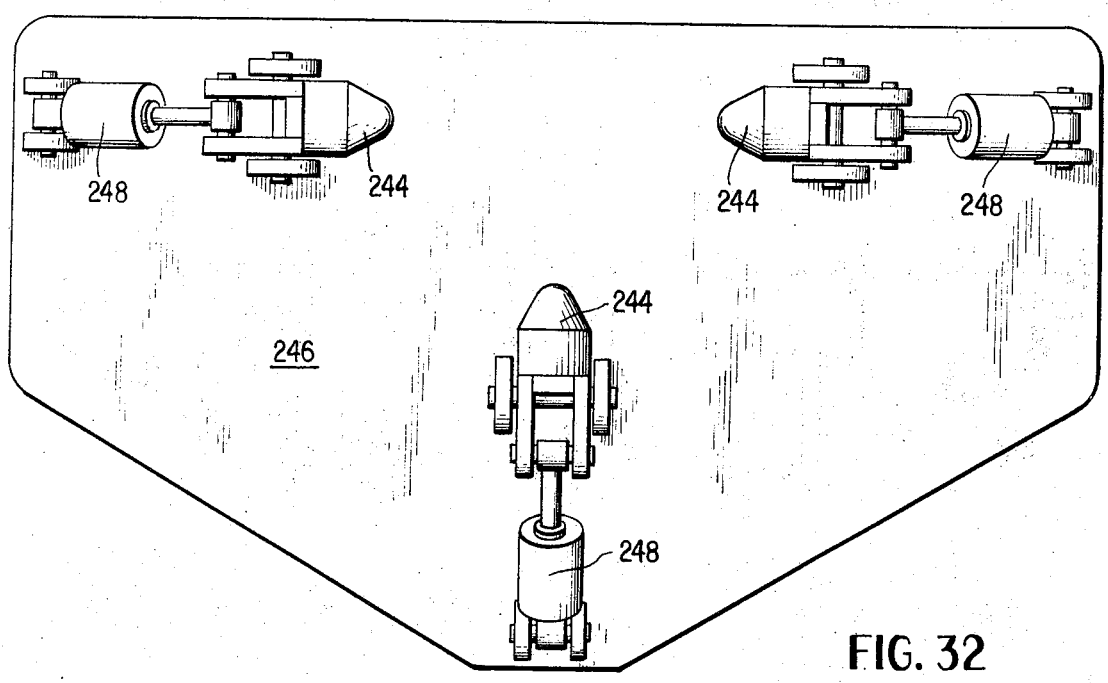
FIG. 32
FIG. 33
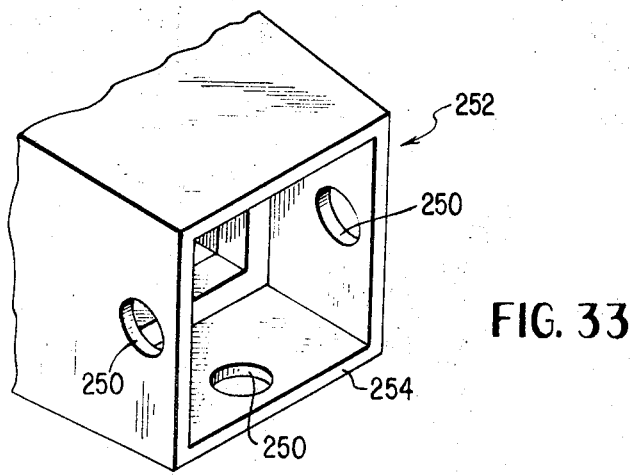

FIG. 34
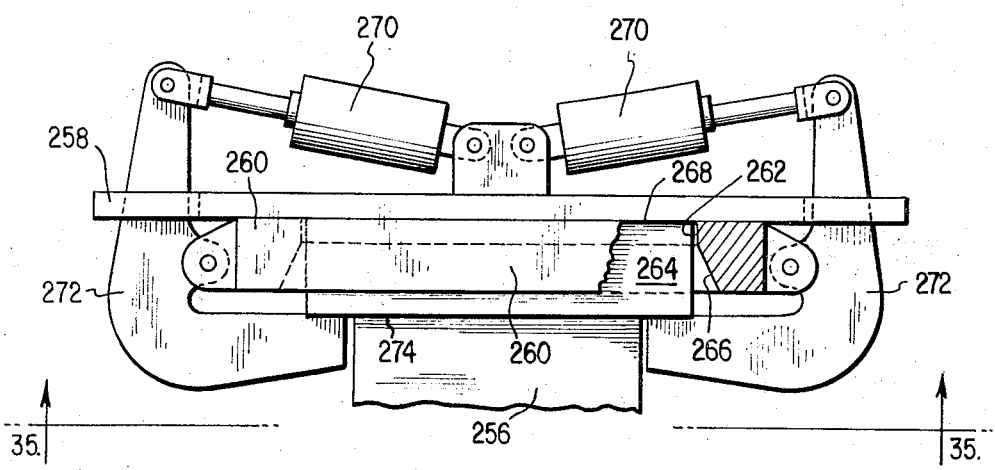
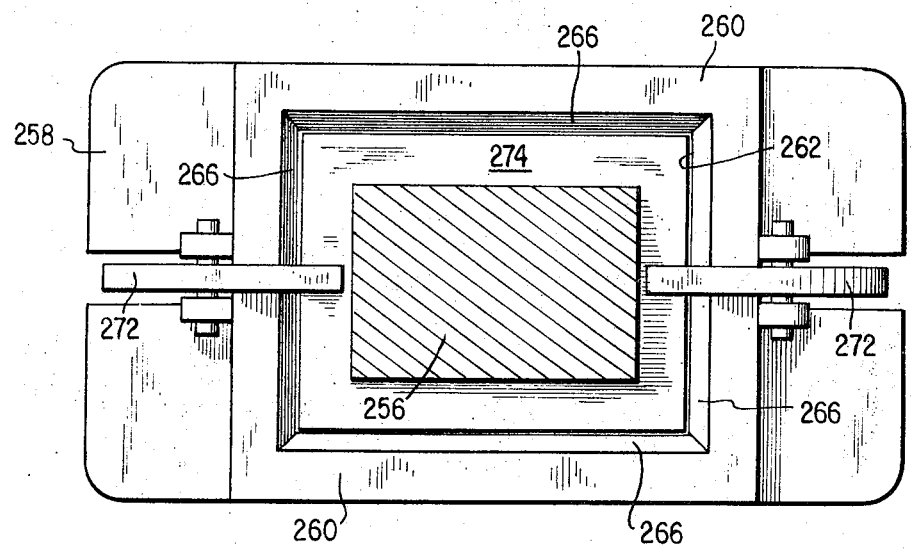
FIG. 35

MULTIPLE IMPLEMENT COUPLING STRUCTURE

BACKGROUND OF THE INVENTION

Coupling by driving, i.e., the automatic coupling between two vehicles as one is driven into engagement with the other, is not new. Exemplary are automatic railway couplers and earth working equipment of the type disclosed in U.S. Pat. No. 3,403,802. In railway vehicles or other land vehicles adapted to traverse a hard surface or other roadway, vertical alignment is normally of little if any concern since the only factor which would normally disturb an initially established vertical alignment, as between the coupling elements on the vehicles, would be loading. Similarly, precise horizontal alignment between such vehicles and the positionment of stops to precisely space the vehicles along their longitudinal axes is not required since the usual desire is to effect an articulated coupling between land vehicles.

In the case of those articulated land vehicles requiring service connections across the coupling juncture; such connections usually take the form of flexible connectors bridging the vehicles whose interconnection is effected manually. In some cases, notably in railway vehicles, these service connections have been automatically coupled as an incident of the vehicle coupling. Such a procedure is practicable where virtually precise alignment in both the vertical and horizontal planes is assured by virtue of the track and wheel engagement and where the number of service connections are minimal. Such, however, is not the case in the environment to which the present invention pertains, viz. off-road vehicles requiring multiple hydraulic interconnections therebetween.

Exemplary of the off-road vehicles with which the present invention is concerned are earth moving scrapers and motor patrol graders. Motor patrol graders are, conventionally, of unitary construction while scrapers normally employ an articulated connection between the implement, or scraper bowl portion, and the traction unit. The advantages inherent in utilized scraper constructions as contrasted with the conventionally articulated units, just referred to, are well set out in applicant's copending patent application Ser. No. 194,897 filed Nov. 2, 1971. Thus, insofar as the use of the aforementioned vehicles for earthworking operations is concerned, it is desirable that the traction unit be functionally integral or rigid with the implement portion. Conversely, insofar as inventory is concerned, it is obviously desirable that the same traction unit be useable with different implements.

The primary problems faced by a user of such convertible equipment are the difficulty in coupling the equipment under the usual off-road conditions and the ability to obtain a rigid interconnection while providing the necessary hydraulic service connections from the traction unit to the implements.

The first of these difficulties is occasioned by the fact that the vertical position of the coupling structure on a decoupled implement parked under off-road conditions will inherently shift due to poor soil conditions and/or weather conditions. Thus, typically the very substantial weight of an earth moving bowl and scraper frame will cause the implement to move downwardly under muddy field conditions relative to its original parked position. Such vertical misalignment between the implement and traction unit has required considerable effort in the past to recouple the vehicles.

A necessary corollary to the vertical alignment problem just discussed is one of horizontal alignment if a rigid interconnection is to be obtained. This for the reason that the implement coupling structure must be firmly bottomed against both horizontal and vertical stops before a positive interlock can be secured in place.

In addition to the requirement for a rigid coupling, precise horizontal and vertical positioning is essential to permit automatic or semi-automatic coupling of multiple service connections across the coupled vehicles. For example, in the case of a typical scraper unit of the type disclosed in the aforementioned copending application, no less than eight hydraulic service connections are required to provide the supply and return lines for apron, ejector, lift and bowl pitch control cylinders. It is quite evident that if eight separate service connections are to be made between the vehicles without the intermediary of a manual manipulation of flexible control lines; the vehicles must be precisely aligned both horizontally and vertically.

The disclosure in the aforementioned U.S. Pat. No. 3,403,802 is typical of the prior art approach to the automatic coupling of off-road vehicles where no provision is made for either precise horizontal alignment or a rigid securement between the vehicles.

SUMMARY OF THE INVENTION

The purpose of the invention is to provide coacting coupling structure between an implement and traction unit which will permit coupling by driving to rigidly couple the same in predetermined three dimensional relationship. With the units so positioned and rigidly coupled, a mating relationship between all other coacting structure rigidly carried by the vehicles, such as hydraulic service couplings, is automatically assured.

Precise three dimensional positioning is achieved by the provision of cam surfaces on the coupling elements of both vehicles which coact to produce a relative shifting movement of the vehicles, both vertically and horizontally, as required to reach a fixed stop position which stop position defines the third dimensional adjustment. This relative shifting or aligning movement takes place as a function of the force vectors applied between the coacting cam surfaces as the traction unit is driven into engagement with the implement unit. Following the mating fit of the coating cam surfaces, power operated latch means are energized from the operator's station to positively integrate the vehicles into a single functional unit.

Following the rigid coupling of the vehicles, relatively moveable hydraulic couplings on the implement and traction units may be interconnected to provide a source of fluid pressure for the implement carried power cylinders. Alternatively, the hydraulic service connections may be affected automatically as a function of the vehicle coupling movement.

Various embodiments of the invention include power operated decoupling means, which may be integrated with the latching means or distinct therefrom, to provide a positive decoupling action; and a hydraulically adjustable coupling component for effecting coarse adjustments between the traction unit and implement unit prior to the final coupling operation, by driving.

In one particular embodiment of the invention, the power operated latching means may be carried on the implement rather than the traction unit which provides the source of hydraulic power and, in such case, the necessary supply and exhaust lines for the power operated latching means may be manually coupled across the coupling juncture. Thereafter, the remainder of the hydraulic service connections are effected semi-automatically or automatically.

DESCRIPTION OF THE DRAWINGS

FIGS. 19 and 20 are front detailed perspectives of male and female service connectors, respectively, that may be substituted for the service connectors shown in FIGS. 17 and 18;

FIGS. 21 and 22 are fragmentary elevations illustrating sequential steps in effecting the service connections following a rigid coupling of the vehicles;

FIG. 23 is a fragmentary sectional view taken through the service connector structure and illustrating details of one hydraulic plug connector at an intermediate position in the service coupling operation;

FIG. 24 is a cross-section taken along line 24—24 of FIG. 23;

FIG. 25 is a view similar to FIG. 23 but illustrating the completed hydraulic service connection;

FIG. 26 is a perspective view of traction and scraper units illustrating a further modified coupling structure;

FIG. 27 is a fragmentary vertical cross-section illustrating the coupled position of the vehicles shown in FIG. 26;

FIGS. 28 and 29 are plan and front views, respectively, of power operated positioning and latching means adapted for mounting on a traction unit;

FIG. 30 is a fragmentary perspective of that implement mounted coupling structure adapted to coact with the structure shown in FIGS. 28 and 29;

FIGS. 31 and 32 are views similar to FIGS. 28 and 29, respectively, of further modified coupling structure;

FIG. 33 is a fragmentary perspective of coupling structure adapted to coact with the coupling structure of FIGS. 31 and 32;

FIG. 34 is a fragmentary plan view of a further modified latched coupling structure for integrating traction and implement units; and FIG. 35 is a view taken along line 35—35 of FIG. 34.

DESCRIPTION OF THE PREFERRED EMBODIMENTS

Figure 1:
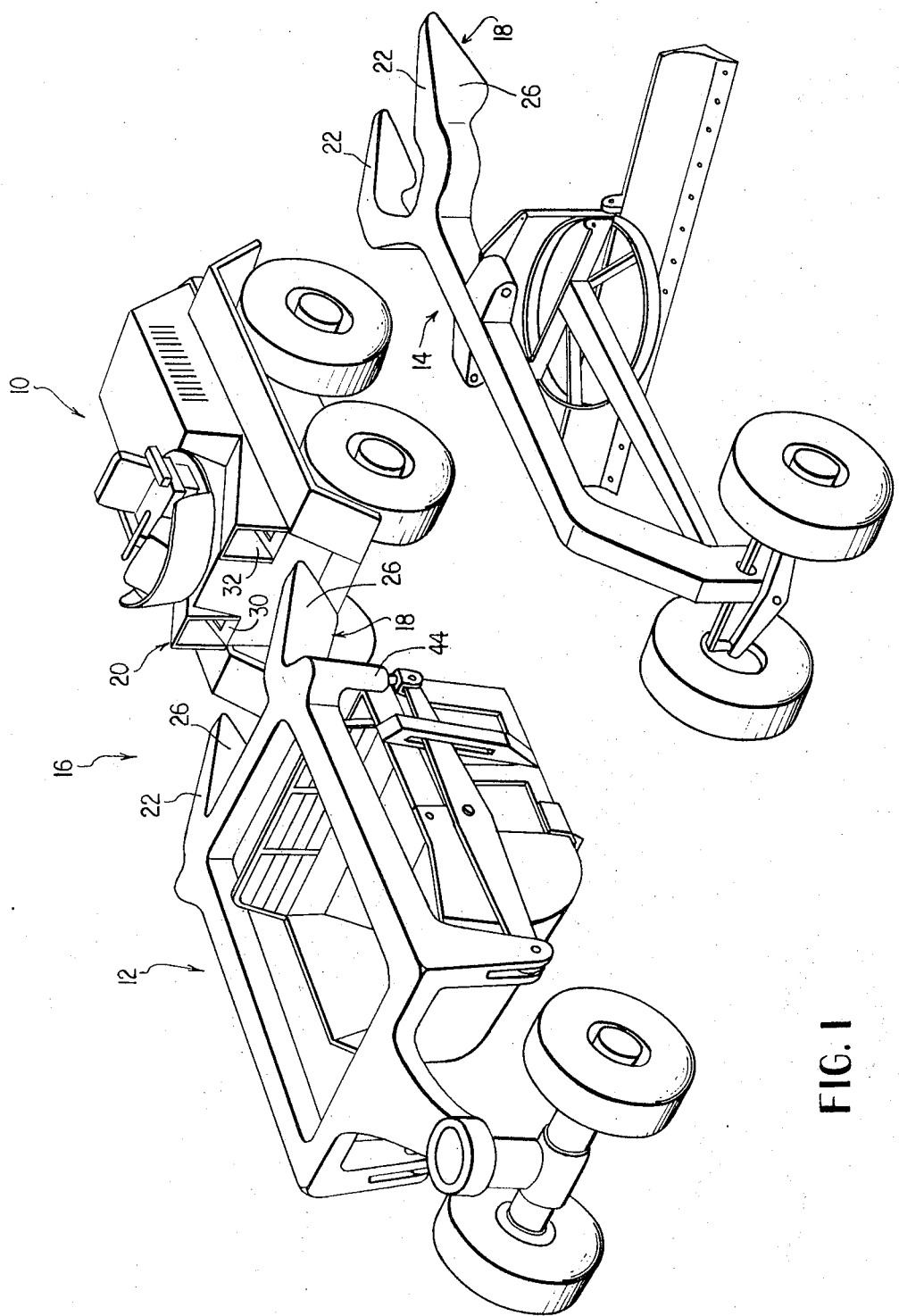
FIG. 1 is a perspective view of a traction unit and exemplary earthmoving implements which may be coupled therewith in accordance with the invention.

In FIG. 1 is illustrated a powered traction unit 10 and implement units 12, 14 herein illustrated as a scraper and patrol grader, respectively, which are individually adapted for rigid coupling with traction unit 10 through the intermediary of coupling structure 16 including horizontally spaced tongue and socket connector pairs 18, 20, respectively. In the particular embodiment depicted in FIGS. 1 and 2 the socket connectors 20 are integral with the traction unit although, as will be apparent from the ensuing description, the relative integration of the tongues and sockets on the implement and traction units or vehicles may be reversed.

Each tongue connector 18 is generally rectangular in cross-section and opposed surfaces thereon are convergent toward the outer ends thereof to define upper and lower cam faces 22, 24 and opposed side cam faces 26. The upper, lower and side walls 28, 30, 32 of sockets 20 are configured in a complementary manner to define cam faces which are in full face-to-face bearing engagement with the corresponding cam faces on tongues 18 when the vehicles are fully coupled as in FIG. 2.

A power operated latch 34 (FIG. 2) is mounted adjacent each socket 20 for oscillatory pivotal movement about pivot axis 36 into and out of locking engagement with an opening 38 in lower socket wall 30 and a recess 40 opening through tongue cam face 24 under the influence of a double acting ram 42.

Figure 2:
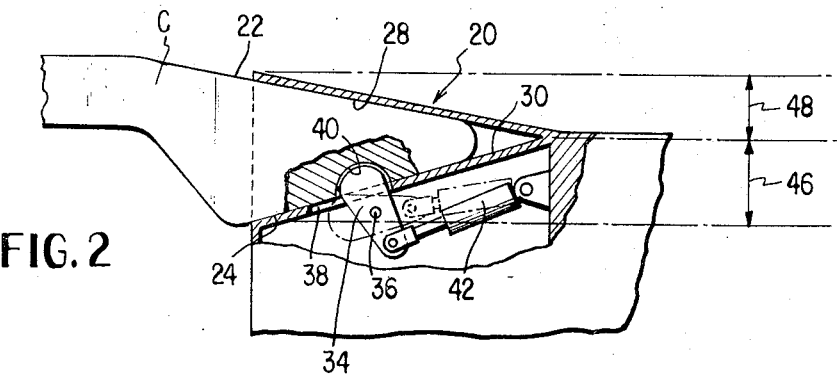
FIG. 2 is a fragmentary sectional elevation of a portion of the vehicle coupling structure illustrating an exemplary power operated latch.

In operation, and assuming the scraper 12 of FIG. 1 to have been initially positioned with the tongues 18 thereof at the same vertical height relative to sockets 20 as illustrated in FIG. 2 by virtue of the operator having extended bowl lift cylinders 44 to support one end of scraper 12 prior to uncoupling the same from traction vehicle 10; recoupling, by driving, may be accomplished even though the coupling end of the scraper may have settled a distance equal to or less than the indicated vertical distance 46 (FIG. 2).

This for the reason that as traction vehicle 10 is driven forwardly from the position of FIG. 1, the lower socket wall 30 of each socket 20 will engage a corresponding lower cam face 24 on each tongue 18 to cam the same upwardly. Simultaneously, side cam faces 32 in sockets 20 coact with the corresponding side cam faces on tongues 18 to correct any horizontal misalignment. As forward movement of vehicle 10 continues, the coupling end of scraper 12 is shifted vertically and horizontally under the combined influences of the coacting cam surfaces until the tongues 18 bottom in sockets 20 against the collective stop means defined by the full face-to-face engagement of all the mating cam faces. It will be apparent that it is the various resultants of the varying force vectors applied to the coupling structure as a result of the forward movement of vehicle 10 that effects the full telescopic engagement of parts as shown in FIG. 2. Rams 42 are then activated to pivot latches 34 into locking engagement in recesses 40 to complete the integration of the traction and implement units into a rigid earthmover. As a practical matter, vertical misalignment between the uncoupled vehicles is frequently in a sense opposite to that just described, i.e., the coupling structure on the approaching traction vehicle is below that of the implement vehicle as by virtue of the particular off-road conditions. In such event it is the corresponding upper tongue and socket cam faces 22, 28 that coact to effect realignment over the vertical distance 48 (FIG. 2).

In order to gain a full appreciation of the three dimensional relative movement which takes place between the vehicles during a coupling operation, by driving, it is necessary to understand the concept herein referred to as dynamic coupling and the manner in which the same is effected. Once the operator has maneuvered the traction vehicle in such a manner as to insure initial reception of the outer ends of tongues 18 into the openings of sockets 20 it is then only necessary for the operator to continue forward driving over whatever distance is required (usually only a few feet) until both tongues 18 are firmly seated in sockets 20. Unless the operator's judgment of the horizontal alignment, upon approach to the implement vehicle, has been perfect the coupling operation will require some forward movement of both vehicles to induce the required relative camming movements between the two vehicles. Even in the absence of fine maneuvering adjustments by the operator, continues pushing of the implement vehicle once the ends of both tongues 18 are captivated in the sockets insures that both tongues will come into full aligning engagement with their respective sockets by virtue of the continued driving creating the varying force resultants reacting between the corresponding mating cam faces. Thus, the expression "dynamic coupling" as used herein refers to that relative movement of the vehicles which takes place as an incident of the pushing force exerted by one vehicle on the other. The coupling operation is complete when actuation of the power latch operating control levers (not shown) drive latches 34 to the locked position of FIG. 2. In the event that attempted latching of either latch 34 is unsuccessful as would be the case when the tongues 18 are not fully bottomed in sockets 20, the dynamic coupling operation is continued as by continued pushing of the implement vehicles until latch operating ram 42 can be fully extended as may be indicated to the operator in any desired conventional manner such as by the observation of pressure gauges, direct observation, etc.

In the embodiment shown in FIGS. 1 and 2, decoupling is accomplished by retracting rams 42 and backing the traction vehicle away from the implement vehicle after first having extended lift arm rams 44 to support the tongue end of the implement vehicle through the scraper bowl.

Figure 3:
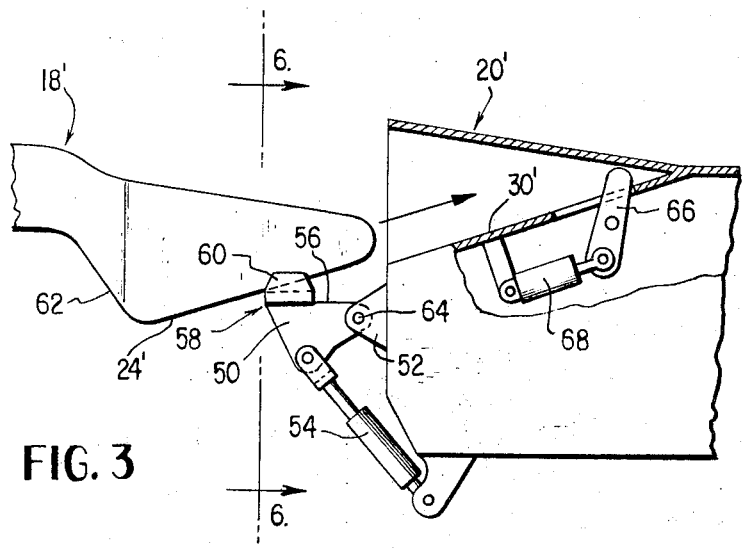
FIGS. 3–5 are fragmentary elevations of a modified coupling structure illustrating a sequential relationship of parts during a typical coupling operation.
Figure 6:
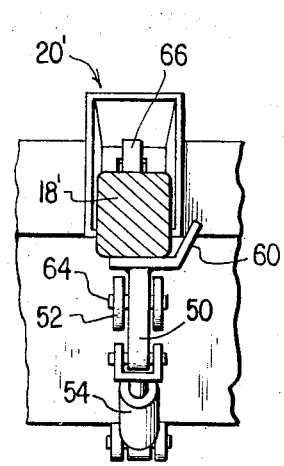
FIG. 6 is a cross-section taken along line 6—6 of FIG. 3.
Figure 4:
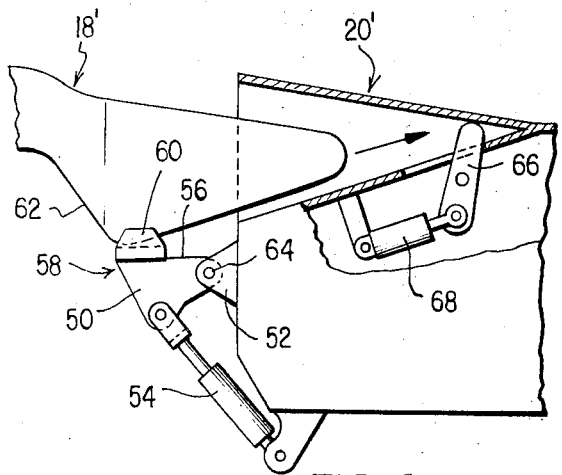

In FIGS. 3–6 is illustrated an embodiment of the invention which permits coupling by driving even through the vertical misalignment between vehicles exceeds that which can be compensated for by the embodiment shown in FIGS. 1 and 2. A combined lifting, guiding and latching lever 50 is pivotally mounted between mounting lugs 52 just below and outwardly of lower cam face 30' of each of sockets 20' for pivotal movement between the lower lifting and guiding position of FIG. 3 and the upper latching position of FIG. 5 under the influence of a double acting ram 54. The upper edge surface 56 of each lever 50 has secured thereto, as by welding or the like, a plate-like guide 58 including an upstanding guide flange 60 on the outer side thereof. In the event that the implement vehicle has settled to such an extent that tongues 18 are below the lower cam faces 30' of sockets 20', i.e., a distance exceeding that indicated by reference character 46 in FIG. 2; ram 54 is fully retracted prior to commencement of the coupling operation so that the downwardly inclined upper surfaces of guides 58 can be maneuvered beneath the lower cam faces 24' of tongues 18' as shown in FIG. 3. This construction, in effect, forms inclined ramps for guiding the tongues into sockets 20'. In order to reduce traction vehicle draft requirements, the ram 54 may be partially extended to raise tongues 18' to the solid line position of FIG. 3, for example, before the traction unit is advanced through the positions of FIGS. 3 and 4 to reach the position of FIG. 5. After tongues 18' have bottomed in sockets 20' rams 54 are fully extended to engage back surfaces 62 of tongues 18' to lock the same in the sockets. It will be apparent that the flanges 60 on guides 58 act, in effect, as outer extensions of the socket side faces to assist in effecting coarse horizontal alignment of the vehicles while the powered articulation of lever 50 about its pivotal mounting 64 on the traction unit effects an initial, coarse, vertical adjustment. One advantage in the use of the particular latching mechanism shown in FIGS. 3–6 is that the positions of levers 50, and particularly flanges 60, are readily visible to the operator so that an indirect indication of whether the locking latches are fully engaged is not required as is the case where the locking latches are not exposed to view.

Figure 5:
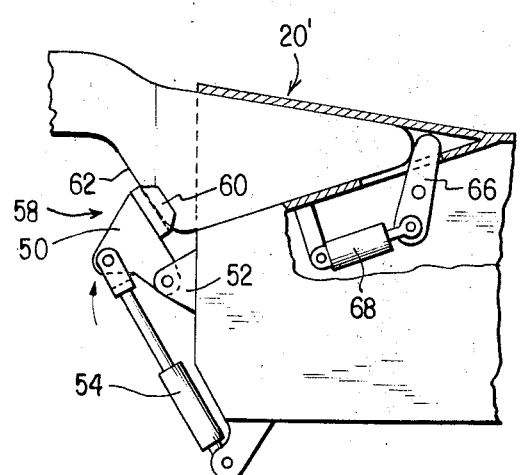

It is quite common for the rigid coupling to become frozen after a period of use making it difficult if not impossible to effect decoupling by driving. To this end, decoupling levers 66 are mounted adjacent the inner ends of sockets 20' for pivotal movement into and out of intersecting relation with the fully engaged position of the forward ends of tongues 18'. Thus, as shown in FIG. 5, extension of decoupling rams 68 following the retraction of latching rams 54, pivots levers 66 counter clockwise to forcibly separate tongues 18' from the fully coupled position of FIG. 5.

Figure 7:
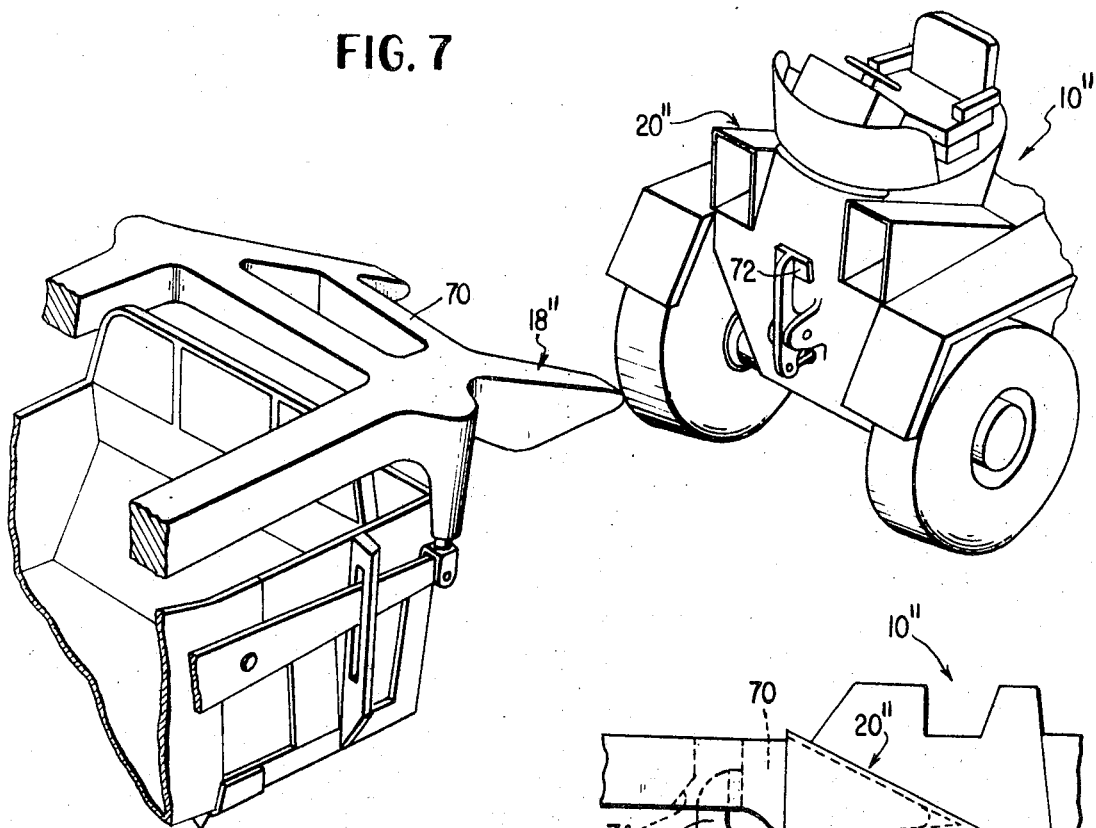
FIG. 7 is a fragmentary perspective of a traction unit and scraper unit employing a modified coupling structure having a single power operated latch.
Figure 8:
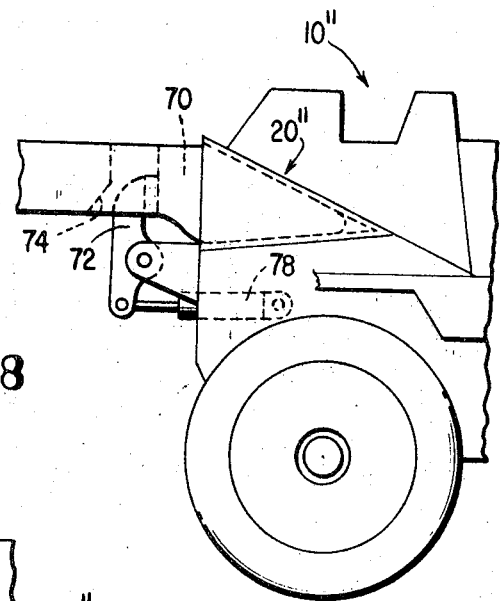
FIGS. 8 and 9 are elevation and plan views, respectively, of the vehicles of FIG. 7 in coupled relationship.
Figure 9:
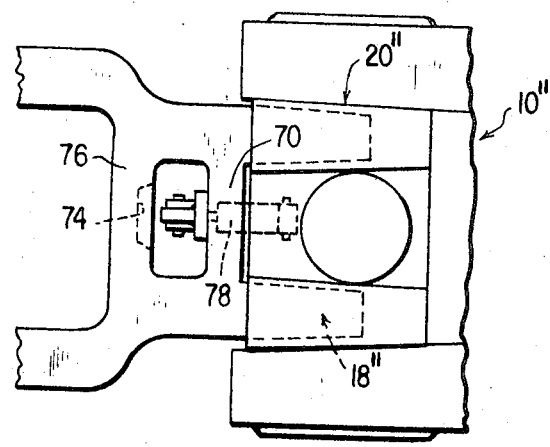

The modification shown in FIGS. 7–9 differs from that of FIGS. 1 and 2 in that the tongues 18" are interconnected rearwardly of the cam faces thereof by a rigid cross brace 70 which is adapted for central engagement by a single latching lever 72 to maintain a rigid coupling between tongues 18" and sockets 20".

In operation, traction vehicle 10" is driven forwardly to effect coupling by driving in the manner previously explained and the coupling operation is complete when central recess 74 in a rear cross brace 76 is appropriately positioned so that extension of latching ram 78 can move latching lever 72 to the position of FIG. 8.

The four separate embodiments depicted in FIGS. 10, 11–12, 13 and 14, respectively, illustrate constructions wherein the positions of the basic coupling structure are reversed, i.e., the sockets are rigid with the implement vehicle while the tongues are rigid with the traction vehicle. Although the power operated equipment for performing the latching, decoupling and/or coarse adjusting functions may be mounted on the traction unit they are illustrated in FIGS. 10–14 as being carried by the implement vehicle. Where the hydraulic service connections are to be effected as a function of the coupling by driving, as will be subsequently explained, the power operated equipment becomes operative simultaneously with the movement of the tongues into full telescoping engagement with their sockets so that the latching means may be activated from the usual hydraulic power source carried by the traction vehicle. In other instances, and as particularly illustrated in FIG. 10 as being applicable to all the embodiments of FIGS. 10–14; separate hydraulic service connections may be manually effected across the coupling juncture, if desired. It is to be understood that in this latter event it is only the service connections for the latching ram that is envisioned with the remainder of the hydraulic service connections being effected concomitantly with the coupling operation as will be explained in conjunction with FIGS. 15–25.

Figure 10:
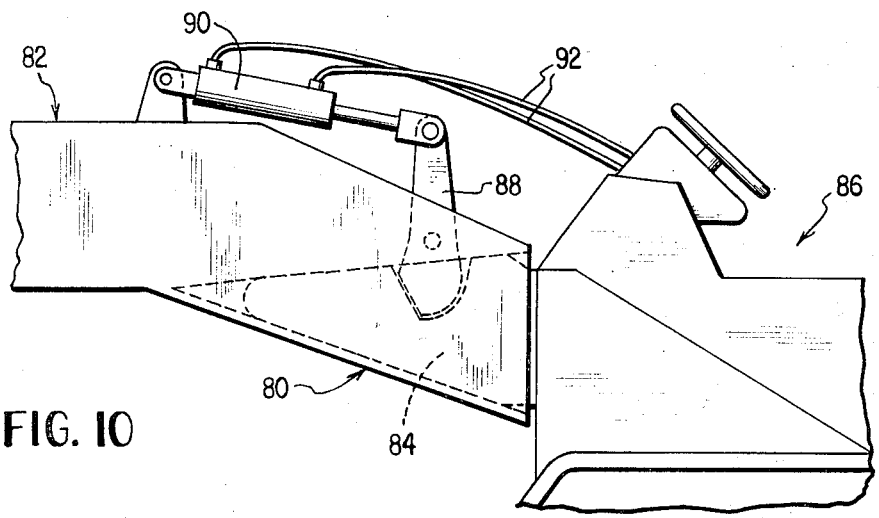
FIG. 10 is a fragmentary elevation of a modified coupling structure illustrating the mounting of a power operated latch on the implement vehicle.

Referring now to FIG. 10, sockets 80, rigid with implement vehicle 82, are provided with four distinct cam faces substantially identical with those previously described which coact with complementarily shaped cam faces on tongues 84 integral with traction unit 86. Latching lever 88 is mounted on the implement frame for powered actuation by latching ram 90 whose supply and return lines 92 are adapted to be manually connected across the coupling juncture prior to the time the remainder of the service connections are made. Thus, following movement of the traction and implement units to substantially the relative positions shown in FIG. 10, lines 92 are interconnected with similar lines (not shown) on vehicle 86 and latch 88 is moved to the locked position of FIG. 10. The remainder of the service connections are then effected in the manner detailed in the description of FIGS. 15–25.

Figures 11, 12:
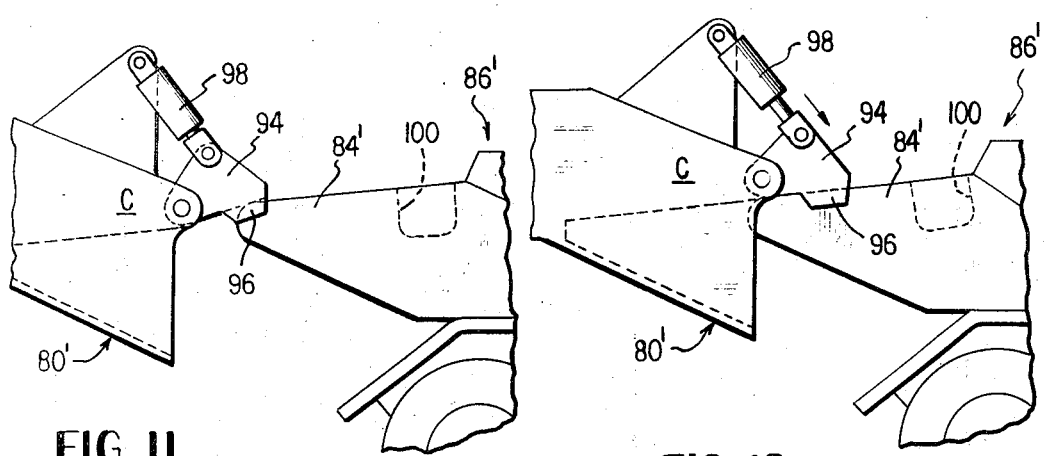
FIGS. 11 and 12 are fragmentary elevations of a further modified coupling structure illustrating sequential coarse adjustments, in a vertical plane, prior to a final coupling operation, by driving.

FIGS. 11 and 12 illustrate sequential steps in effecting a coarse vertical adjustment between the coacting coupling structure generally similar to that described in connection with FIGS. 3–6.

The combined latching and adjusting levers 94 mounted on the implement frame adjacent each of the spaced sockets 80' include guide flanges 96 adapted to coact with the outer cam faces of tongues 84'. Thus assuming the implement frame to have settled to such an extent that the vertical adjustment required exceeds the distance 46 (FIG. 2); traction vehicle 86' is manuevered into the position of FIG. 11 whereupon the service connections (not shown) for the coarse adjusting and latching rams 98 are made as in the embodiment of FIG. 10 and the rams are extended to the position of FIG. 12 to effect the initial, coarse vertical adjustment. Vehicle 86' is thereafter driven forwardly until tongues 84' bottom against the collective stop means defined by the cam faces of sockets 80' and rams 98 are further extended to bottom levers 94 in locking recesses 100 formed in tongues 84'.

Figures 13, 14:
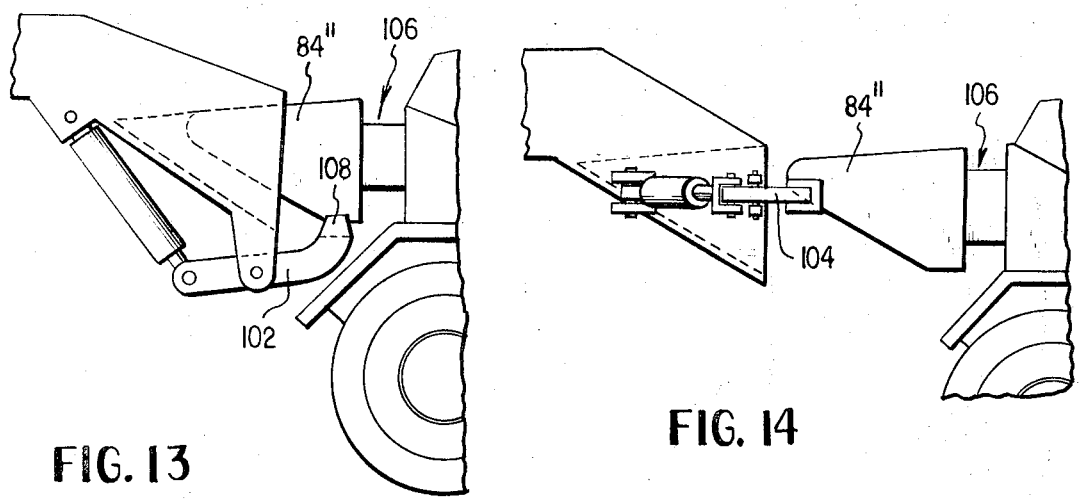
FIGS. 13 and 14 are fragmentary elevations of further modified coupling structures employing a similar male coupling element adapted for use with either of the power operated latches shown in the respective Figures.

FIGS. 13 and 14 illustrate bottom and side mounted latching levers 102, 104, respectively, which may cooperate with similarly formed circumferential recesses 106 on tongues 84''. It will be apparent that the use of side mounted latching levers 104 (FIG. 14) requires that the vertical misalignment between the decoupled vehicles not exceed that which can be compensated for by the respective cam faces on the tongues and sockets. Similarly, the lower mounted latching lever 102 (FIG. 13) permits the coarse correction of a greater vertical misalignment but only that horizontal adjustment afforded by a coaction of flanges 108 with the outer side faces of tongues 84''. The traction vehicle is then driven forwardly from either of the positions of FIGS. 13 and 14 until the respective latching lever can be fully engaged with a top or side portion of locking recess 106.

It will be recalled from the foregoing discussion that there are two primary reasons why a rigid and precisely predetermined coupling relationship between the vehicles is desired. The first relates to the unitization of earth moving equipment for reasons well understood with regard to patrol graders and specifically spelled out, as regards scrapers, in the aforementioned pending application Ser. No. 194,897 while the second goes to an important aspect of the invention now to be described with reference to FIGS. 15–25, viz. the alignment of coacting service connections.

Inasmuch as the proper functioning of the service connections described in conjunction with FIGS. 15–25 is independent of the particular power operated latching system employed, the latching mechanism is not illustrated; it being understood that any of the latching systems and/or the coarse adjusting systems disclosed herein could be employed. Similarly, power decoupling mechanism, such as shown in FIG. 5, is contemplated for use with any of the disclosed tongue and socket coupling combinations. The arrangement wherein the power latching mechanism and socket components of the coupling are mounted on the traction vehicle is a more convenient one for illustration though it will be understood that this relative relationship could be reversed, as in FIGS. 10–14, without affecting the service connection concept.

Figure 15:
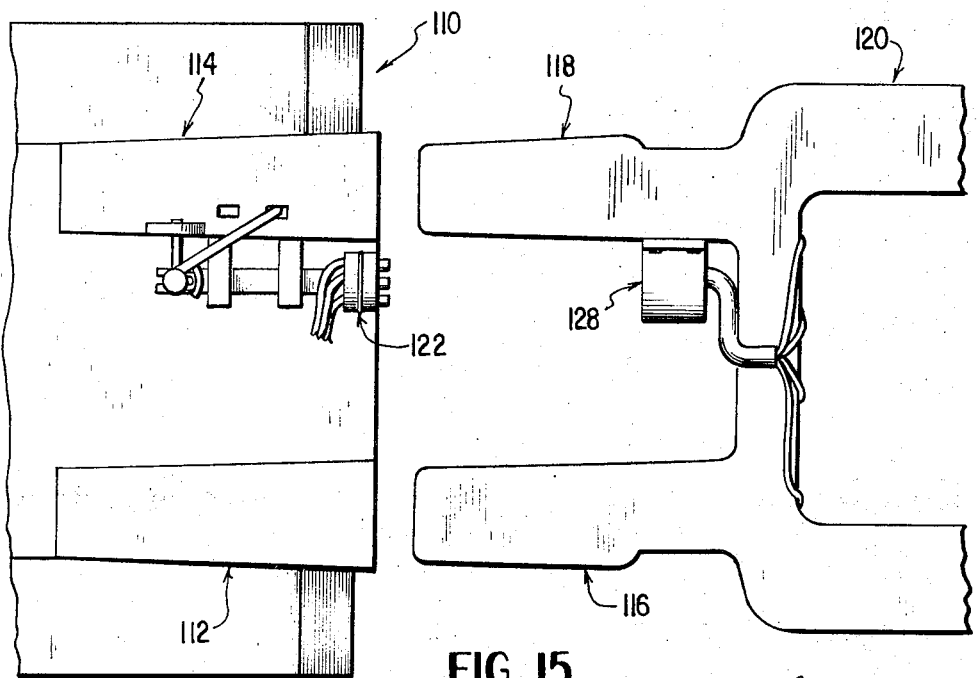
FIG. 15 is a fragmentary plan view of coupling structure of the type shown in FIG. 1 and including semi-automatic service connections.
Figure 16:
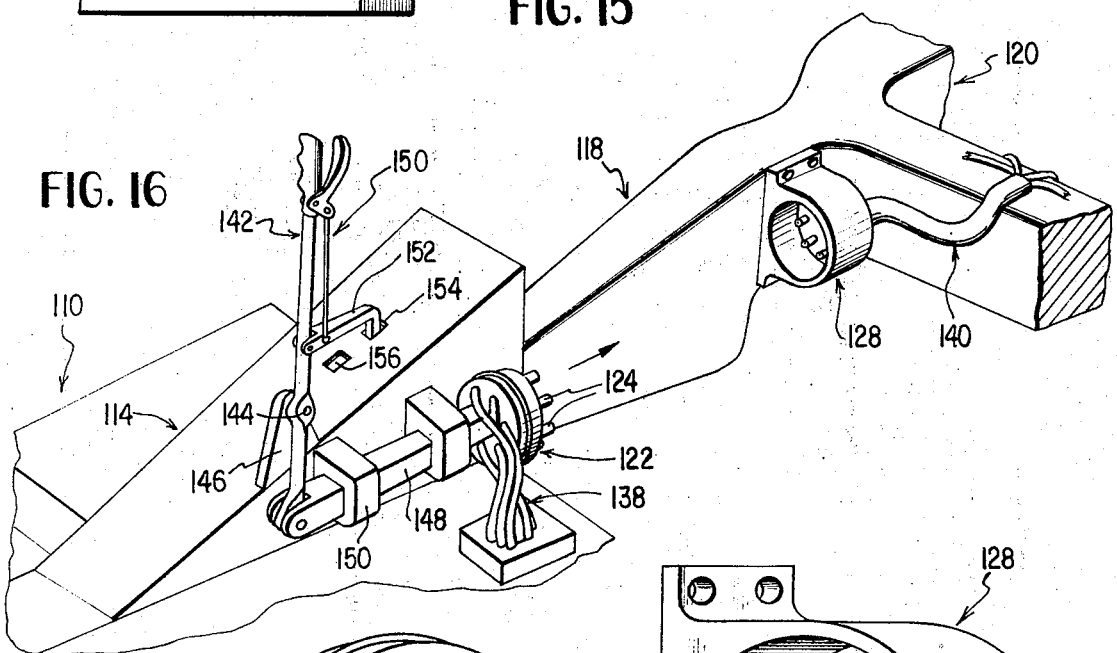
FIG. 16 is a fragmentary perspective of a portion of the coupling structure shown in FIG. 15.
Figure 17:
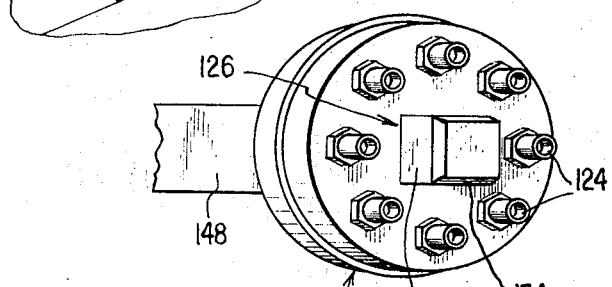
FIG. 17 is a front detailed perspective of the male service connector shown in FIG. 16.
Figure 18:
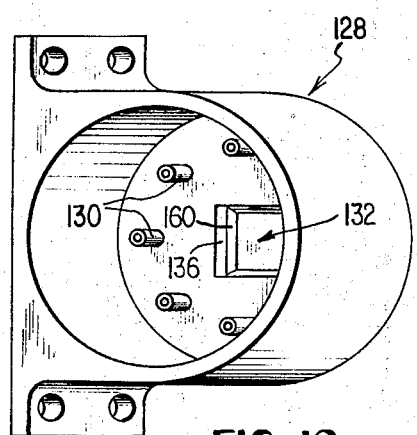
FIG. 18 is a front detailed perspective of the female service connector of FIG. 16.

In FIGS. 15 and 16 are fragmentarily illustrated a traction vehicle 110 including coupling sockets 112, 114 adapted for coaction with tongues 116, 118 on implement vehicle 120. A male fluid coupling connector 122 including a plurality of female plug connectors 124 and a central locating probe 126 (FIG. 17) is mounted on traction vehicle 110 for reciprocal movement into the out of telescoping engagement with a female fluid coupling connector 128 rigid with implement vehicle 120. Female coupling connector 128 includes a plurality of male plug connectors 130 and a central locating recess 132 (FIG. 18) adapted for telescopic engagement with the corresponding plug connectors and probe of the male coupling connector. The locating probe 126 and locating recess 132 each include complementary shaped cam faces 134, 136 for assuring registration of the plurality of coacting plug connectors 124, 130 prior to the final telescopic movement of the same from the position of FIG. 23 to that of FIG. 25.

Referring again to FIG. 16, the various hydraulic supply and return lines 138 carried on traction unit 110 interconnect the conventional pump and reservoir (not shown) with plug connectors 124. Similarly, supply and return lines 140 carried on the implement vehicle are appropriately interconnected between plug connectors 130 and the various power cylinders on the implement vehicle.

Male coupling connector 122 is mounted for limited reciprocal movement relative to traction vehicle 110 through the intermediary of a control handle 142 fulcrummed about the axis of pivot 144 on a bracket 146 upstanding from the traction unit. Control handle 142 is interconnected at the lower end thereof with one end of guide bar 148 extending through slide bearing brackets 150 to terminate in an integral connection with the male coupling connector. Guide bar 148 and male connector 122 are moveable from the locked, retracted position of FIG. 16 to a locked, extended position by manipulation of locking lever 150 and handle 142 in an obvious manner to position locking pawl 152 in either of locking recesses 154, 156.

Detail views of the individual hydraulic plug connector pairs appear in FIGS. 23 and 25 wherein FIG. 23 illustrates the position of mating connector plugs at a point in time after the coacting cam faces 134, 136 of the locating probe and recess have just brought the respective parallel surfaces 158, 160 of the probe and recess into bearing engagement but before the probe has been fully seated in the recess. Each female plug connector 124 is recessed at 162 to receive the male plug connector 130 in fluid sealing engagement. Each male and female plug connector includes a valved port controlled by a valve head 164, 166 extending outwardly of the corresponding valve seat 168, 170. A valve stem 172 extends rearwardly of each valve head through a guide opening 174 in a perforated retainer 176 (FIG. 24) against which a compression spring 178, encircling each valve stem, is bottomed. Each valve head 164, 166 is normally biased to a closed position on corresponding seats 168, 170 by the springs 178 and the hydraulic pressure which may be resident in lines 138, 140.

In operation, after a vehicle coupling operation is complete as described in connection with FIGS. 1 and 2 for example, the male and female coupling connectors are in substantially complete alignment by virtue of the precise positioning afforded by the coacting cam faces on the tongues and sockets. It is preferable, at this point, to activate the appropriate latching lever or levers to firmly rigidify the coupling connection prior to effecting the service connection across the coupling juncture. It is then only necessary for the operator to release locking pawl 152 and move lever 142 counter clockwise from the position of FIG. 16. As male coupling connector 122 moves forwardly from the vehicle coupled position of FIG. 21 toward the service connection coupled position of FIGS. 22 and 25; any slight misalignment, either horizontal or vertical, which may exist between the vehicles is corrected by coacting cam faces 134, 136 of the locating probe and recess. FIG. 23 is illustrative of this transitional position between FIGS. 21 and 22. Further movement of lever 142 to the fully extended position of male connector 122 (FIGS. 22 and 25) results in the unseating of valve heads 164, 166, as shown in FIG. 25, by their mutual abutment thus intercommunicating the respective supply and return lines on the traction and implement vehicles. The engagement of locking pawl 152 with locking recess 156 assures the maintenance of the inter-vehicle service connections.

In FIGS. 19 and 20 are illustrated alternate male and female coupling connectors which differ from those of FIGS. 15–18 only in the details of the fine alignment mechanism. Thus, rather than the locating probe and recess, each male and female connector 180, 182 employs diametrically opposed key and slot locators 184, 186. Each key 184 is tapered forwardly along the three long sides thereof while slots 186 are tapered in a complementary manner.

It is apparent from an inspection of FIGS. 16, 23 and 25 that corresponding parts of the vehicles, viz. the sockets and tongues when considering the examples of FIGS. 15–25, must occupy precise relative positions in all three spatial relations prior to the time male connector 122 is moved forwardly from the position of FIG. 16; any variations in relative position along any of the x, y or z axes being sufficient to defeat a primary desideratum of the invention which is the ability to effect service connections from the operator's station on traction unit 110. To reiterate, precise positioning in one dimension such as along the x axis is effected by the coacting tongue and socket side cam faces while the upper and lower cam faces determine y axis positioning and the full face-to-face engagement of the tongues and sockets determine z axis position (relative spacing of the vehicles along their longitudinal axes).

A somewhat different configuration of coupling parts which is productive of the same precise three dimensional positioning of the coupled vehicles is shown in FIGS. 26 and 27 wherein the flat, front surface 188 of a single, broad truncated tongue 190 on implement vehicle 192 is guided into full abutting engagement with stops or pads 194 on traction vehicle 196 by four spaced aligning flairs 198 and rigidly locked in engagement therewith by latches 200. The upper, lower and side surfaces 202, 204, 206 of tongue 190 are tapered forwardly and the aligning flairs, positioned to coact with intersecting sides of tongue 190 at the corners thereof, are flaired in a complementary manner.

In order to couple the vehicles shown in FIG. 26, latching rams 208 are retracted and vehicle 196 is driven forwardly with flairs 198 camming tongue 200 as necessary to effect a full bearing engagement flat face 188 and each of stops 194. Latching rams 208 are then extended to pivot latches 200 about their fixed pivots 210 on traction vehicle 196 to engage opposed locking recesses 212 formed in the upper and lower surfaces 202, 204 of tongue 190. An arcuate tongue engaging surface 214 on each of latches 200 acts to cam the coupled vehicles in such a manner as to correct any slight misalignment that may yet exist in a desired unique positional relationship between the vehicles due to insufficient forward driving during the coupling operation. Further in this vein an uneven terrain could require substantial forward driving before the full bearing engagement between face 188 and stops 194 is achieved which excessive forward driving may be dispensed with by using latches 200 to complete the complementary camming action commenced by the initial forward driving. Also, an alternate and/or additional pair of latches could be used, if desired, which would coact with latching recesses in side faces 206 of tongue 190.

The invention is equally applicable to the coupling of a relatively smaller implement to the traction vehicle which smaller implements may or may not be wheeled. Exemplary of this latter class are front end loaders, dozers, rollers and snow plows. Thus as would be expected from the foregoing discussion, the invention may be advantageously utilized with any implement wherein it is desired either to rigidly integrate the implement with the traction vehicle or provide a hydraulic service connection across the coupled units, as for the pitch control cylinders of a dozer blade for example. When the latter of the aforementioned functions is desired and the former is not; such as where a hydraulically powered implement is employed but articulation of the implement relative to the traction unit is required; the necessary articulating connections may be provided on the implement side of the rigid coupling structure now to be described in connection with FIGS. 28–35. In each of FIGS. 28–35 the traction unit and implement frame have been omitted with the Figures merely detailing the coupling structure, per se.

FIGS. 28 and 29 are plan and front views, respectively, of that portion of the coupling structure 215 adapted to be rigidly mounted on the traction unit via mounting plate 216 as by welding or the like while FIG. 30 illustrates that tongue portion 218 of the coupling structure which is rigid with the implement frame.

A locating and adjusting probe 220 is universally mounted, via ball 222, in mounting plate 216. A probe adjusting ram 224 is interconnected, via relatively loose pivots 226, 228, intermediate the back side of mounting plate 216 and a rearward extension 230 of probe 220. Due to the use of relatively loose pivots 226, 228 probe 220 may undergo a slight universal movement relative to plate 216 although it will be apparent that the controlled movement of prove 220, as by actuation of ram 224, is substantially perpendicular to the plane of FIG. 28 which, it will be understood, is primarily design to effect coarse vertical adjustments between the coupling parts 215, 218. The forward flat face of the outer race 230 for bearing 222 serves as the stop against which the flat truncated face 232 of tongue 218 abuts when probe 220 is fully telescoped in a pilot hole or probe recess 234 in tongue 218. The parts are rigidly latched in coupled position by extension of opposed latching rams 236, respectively interconnected between the front face of mounting plate 216 and spaced latching levers 238 on which are mounted dome-shaped latching cams 240, to engage latching cams 240 with the complementary shaped latching recesses 242 in the side faces of tongue 218. As will be apparent from FIG. 28, probe 220 has a substantial forward taper as do latching cams 240. With the latching cams retracted, a traction unit mounting coupling part 215 is driven forwardly to engage the nose of probe 220 with pilot hole 234 in tongue 218. Coarse vertical adjustments may be effected by actuation of probe adjusting ram 224 while the substantial coacting cam surfaces of the probe 220 and its coacting recess 234, effect fine adjustments by driving as the probe is held in the position of FIG. 28. Any final adjustments which may be required are effected by the mating of latching cams 240 with their recesses 242 which firmly bottoms tongue 218 against stop 230.

An additional probe actuating ram, displayed 90° from probe adjusting ram 224, may be provided to effect individual coarse adjustments in both horizontal and vertical planes, if desired.

Although not specifically illustrated, it is to be understood that the hydraulic service connector structure shown in FIGS. 15–25 is contemplated for use with the coupling structure of FIGS. 28–30 as by mounting the male connector on or adjacent mounting 216 and the female connector on or adjacent tongue 218.

FIGS. 31–33 illustrate coupling structure much like that of FIGS. 28–30 except that a separate locating probe is not utilized.

Three latching cams 244, positioned at 90° on mounting plate 246, are individually moveable by latching rams 248 into and out of complementarily cam shaped latching openings 250 in tongue 252 (FIG. 33). Initial coarse adjustments are effected by driving as cams 244, held slightly retracted from the position of FIG. 32, first engage the inclined sides of tongues 252. It is the coacting cam surfaces of latching cams 244 and openings 250 that are relied upon for further three dimensional relative adjustment of the parts. Thus, following initial maneuvering of the vehicle on which mounting plate 246 is rigidly carried to roughly position tongue 252 centrally with respect to partially retracted rams 248; the rams are partly extended and the traction unit advanced. The initial one of the right or left hand cam latches 244 to engage tongue 252 (irrespective of whether the same engages an opening 250) will effect a relative shift of tongue 252, by driving, and the implement frame to which it is connected in a generally horizontal direction. Similarly, engagement of the under surface of tongue 252 will effect a vertical adjustment of the same. Assuming, at this point, that cams 244 have come into at least initial camming engagement with their coacting openings 250; continued extension of rams 248 effects the fine horizontal and vertical positioning as well as that lying generally along the longitudinal axis of the traction vehicle as the three cams pull the flat outer face 254 of tongue 252 into full face-to-face engagement with mounting plate 246.

In the embodiment shown in FIGS. 34 and 35, a lug or tongue 256, adapted for integration with an implement frame, includes a large, outer flanged end of generally rectangular cross-section adapted to be telescopically received within a locking recess defined by traction unit mounting plate 258 and a continuous peripheral wall 260. That portion 262 of wall 260 immediately adjacent mounting plate 258 is parallel to tongue 256 and defines a geometrically similar and just slightly larger cross-sectional configuration that does the flange portion 264 of tongue 256. Wall 260 is flared outwardly of wall portion 262 to define four distinct cam surfaces 266 which coact with the outer end of flange 264 in guiding the forward face 268 of the same into full face-to-face engagement with mounting plate 258. Extension of latching cylinders 270 then pivots latching clamps 272 into engagement with an exposed rear surface 274 of flange 264 as shown in FIG. 35.

It will be appreciated that a common denominator of all the embodiments herein described is the coacting cam and stop structure on each of the coupled units which necessarily defines a unique three dimensional relationship between the units upon continued application of driving force exerted by one of the vehicles against the other. In each case, the $x, y$ adjustments are performed, at least in part, by coacting cam structure while the $z$ positioning (relative spacing of the units generally along a longitudinal axis of the traction unit) is determined by stop means which may be separate from the coacting cam structure or defined as a collective function of the cam structure when the same are all in full face-to-face bearing engagement, as in FIG. 2 for example.

I claim:

1. In a traction and implement unit pair adapted to be rigidly intercoupled at a location in which the elevation of the traction unit differs from the elevation of the implement unit, comprising; coacting coupling means mounted on each said unit pair for defining a unique relative position between the intercoupled portions of said units and rigidly securing the same in said position; said coupling means including a first telescopic coupling pair rigid with one of said units and a second telescopic coupling pair carried by the other of said units; cam means rigid with at least one of said telescopic coupling pair on one of said units for inducing upward or downward relative movement and for inducing lateral relative movement between said units as a function of initial positioning of said coupling pair and relative telescoping movement therebetween; and means for latching said units together in said unique relative position independently of the direction of relative movement therebetween and independently of concurrent movement of the uncoupled units in said position.

2. The traction and implement unit pair of claim 1 wherein said coacting coupling means includes power means mounted on one of said units.

3. The traction and implement unit pair of claim 2 wherein said coupling means include stop means for determining the third dimension of said unique relative position.

4. The traction and implement unit pair of claim 3 wherein said second telescopic coupling pair is rigid with said other of said units.

5. The traction and implement unit pair of claim 4 wherein said first and second telescopic coupling pairs comprise tongue and socket connectors and said cam means comprise a plurality of exterior cam surfaces on each said tongue connector and a like plurality of complementary interior cam surfaces on each said socket connector.

6. The traction and implement unit pair of claim 5 including a latching recess in one of said tongue and socket connectors and means mounting said latching means on the other of said tongue and socket connectors for movement into and out of latching engagement with said recess.

7. The traction and implement unit pair of claim 5 including power operated decoupling means mounted on one of said units for movement into and out of decoupling engagement with the telescopic coupling means carried on the other of said units.

8. The traction and implement unit pair of claim 5 wherein said stop means are defined by said cam means.

9. The traction and implement unit pair of claim 5 wherein said tongue connectors on one of said units include latch engaging surfaces proximate to and spaced from said exterior cam surfaces; means mounting said power operated latching means on the other of said units for movement from a first position spaced along one of said dimensions from the open end of said socket connector to a second position substantially aligned with one of said interior cam surfaces and a third position blocking removal of said tongue connectors whereby power operated movement of said latching means from said first to said second position effects a coarse adjustment of said units in said one dimension and movement to said third position latches said units together by a blocking engagement with said latch engaging surfaces.

10. The traction and implement unit pair of claim 1 including coacting fluid coupling means mounted on each said unit pair.

11. The traction and implement unit pair of claim 10 wherein the coacting fluid coupling means on each said unit includes a plurality of plug connectors; and the longitudinal axes of each said plug connector on one of said units being substantially coaxial with corresponding plug connectors on the other of said units when said units are coupled in said unique relative position.

12. The traction and implement unit pair of claim 11 wherein each said plug connector includes a normally closed valve blocking fluid flow therethrough; and valve actuating means on each said fluid coupling means for opening said valves and intercommunicating said plug connectors as a function of abutting movement thereof along a common axis.

13. The traction and implement unit pair of claim 1 including a pair of fluid coupling connectors on each said unit pair, each connector having a plurality of fluid conduits arranged in a geometrically congruent array; and mounting means mounting one of said fluid coupling connectors for movement relative to said cam means and relative to the other connector for respective coaxial alignment of the respective fluid conduits in said unique relative position of said units.

14. The traction and implement unit pair of claim 13 including valve means normally blocking flow through said fluid conduits; said mounting means including a rigid mounting of one said fluid coupling connector on one of said units and an adjustable mounting of the other said fluid coupling connector on the other said unit; control means for moving said other fluid coupling connector into engagement with said one fluid coupling connector; and valve actuation means responsive to movement of said other fluid coupling connector into engagement with said one fluid coupling connector for opening said valves and intercommunicating the coaxially aligned fluid conduits.

15. In combination with traction and implement units; a coacting coupling pair mounted on each said unit for defining a unique coupled position between adjacent portions of said units, at least one of said coupling pair including cam means for producing upward or downward relative movement and lateral relative movement between said adjacent portions of said units as a function of initial positioning of said coupling means; power means for inducing the relative camming movement; and means for latching said units together in said unique position independently of the direction of relative movement therebetween and independently of codirectional movement of the uncoupled units in said position.

16. The combination of claim 15 wherein said power means comprises the prime mover of said traction unit.

17. The combination of claim 15 wherein said power means comprises a power operated cam.

18. The combination of claim 15 including service conduit means mounted on said adjacent portions of said units; said service conduit means including a service connector coupling mounted on said adjacent portions of each said unit; a like plurality of fluid conduits terminating in a like geometrical array in each said service connector coupling; and corresponding ones of said fluid conduits being positioned for substantial coaxial alignment in the unique coupled position of said units.

19. The combination of claim 18 including valve means for blocking fluid flow of the terminal ends of said conduits; and means mounting one of said service connectors for reciprocal coaxial movement of the terminal ends of said fluid conduits.

20. The combination of claim 19 including valve operating means for opening said valve means as a function of said coaxial movement of the terminal ends of said conduits in the coupled position of said units.

21. In combination with traction and implement units; coacting coupling means mounted on each said unit for defining a substantially unique coupled position between adjacent portions of said units; said coupling means including coacting cam means rigid with each said unit for inducing upward or downward movement and for inducing lateral movement between said adjacent portions of said units as a function of initial positioning of said coacting cam means and driving engagement therebetween; and power operated latching means for securing adjacent portions of said units in said coupled position independently of the direction of relative movement therebetween and independently of codirectional movement of the uncoupled units in said position.

22. The combination of claim 21 including service connection means mounted on said adjacent portions of said units for movement into coaxial alignment as a function of said driving engagement.

23. The combination of claim 22 including selectively operable means mounted on said traction unit for coupling said service connector means.

24. The combination of claim 23 wherein one of said service connector means is mounted for movement relative to the cam means coaxially toward and away from the other service connector means.

25. The combination of claim 21 including power operated decoupling means for forcibly separating said coacting coupling means.

26. The combination of claim 21 wherein said coacting coupling means include tongue and socket connectors.

27. The combination of claim 26 wherein said tongue and socket connectors, each, include a plurality of distinct coacting cam faces.

28. The combination of claim 26 wherein said tongue and socket connectors are generally rectangular in cross-section and, each, include four distinct cam surfaces.

29. The combination of claim 28 wherein said power operated latching means is mounted for movement into latching engagement with a latching recess extending through at least one of said four distinct cam surfaces.

30. The combination of claim 28 wherein said power operated latching means is mounted for movement into latching engagement with said tongue connectors at a position spaced from said four distinct cam surfaces.

31. The combination of claim 28 wherein said tongue connectors comprise a spaced pair of tongues extending outwardly from a cross support on one of said units and tapered toward the distal ends thereof; and said socket connectors comprise a pair of spaced complementary shaped sockets; and said power operated latching means comprising a single power operated latch mounted for movement into and out of latching engagement with a central portion of said cross support.

32. The combination of claim 21 wherein said coacting cam means include a single, truncated tongue on one of said units and four aligning flairs on the other of said units; said truncated tongue including four flat faces tapered distally thereof; and each said aligning flair being positioned for camming engagement with intersecting pairs of said four flat faces adjacent the intersections thereof.

33. The combination of claim 26 wherein said tongue and socket connectors, each, include continuous coacting cam faces.

34. The combination of claim 21 wherein said power operated latching means comprise a plurality of power operated dome-shaped cam elements mounted for movement on one of said units into and out of latching engagement with a like plurality of complementary shaped recesses on the coacting coupling structure of the other unit.

35. The combination of claim 21 wherein said coupling means include stop means for limiting the approaching movement of said units generally along the longitudinal axis of said traction unit.

36. A method of rigidly intercoupling an off-road traction unit at a first elevation with an earth working implement unit at a higher elevation, comprising; manuevering said traction unit into initial engagement with said implement unit, driving the traction unit toward the implement unit and concomitantly imparting three dimensional relative movement between adjacent portions thereof including moving the implement unit portion downwardly relative to the traction unit portion; terminating said three dimensional relative movement; and latching said units together to form a rigid integrated earth mover.

37. The method of claim 36 including adjusting the end of said implement in at least one of said three dimensions prior to imparting said three dimensional relative movement between adjacent portions of the units.

* * * * *

UNITED STATES PATENT OFFICE
CERTIFICATE OF CORRECTION

Patent No. 3,822,756          Dated July 9, 1974

Inventor(s) William E. Martin

It is certified that error appears in the above-identified patent and that said Letters Patent are hereby corrected as shown below:

In column 1, line 42, "utilized" should read --unitized--.

In column 2, line 50, "coating" should read --coacting--.

In column 5, line 41, "continues" should read --continued--.

In column 5, line 58, "vehicles" should read --vehicle--.

In column 6, line 3, "through" should read --though--.

In column 8, line 52, "the" should read --and--.

In column 10, line 45, after "engagement", --between-- should be inserted.

In column 11, line 35, "prove" should read --probe--.

In column 12, line 16, "tongues" should read --tongue--.

In column 15, line 8, "of", first occurrence, should read -- from --.

Signed and sealed this 24th day of September 1974.

(SEAL)
Attest:

McCOY M. GIBSON JR.
Attesting Officer

C. MARSHALL DANN
Commissioner of Patents